(12) United States Patent
Mörwald et al.

(10) Patent No.: US 11,544,860 B2
(45) Date of Patent: Jan. 3, 2023

(54) COMBINED POINT CLOUD GENERATION USING A STATIONARY LASER SCANNER AND A MOBILE SCANNER

(71) Applicant: LEICA GEOSYSTEMS AG, Heerbrugg (CH)

(72) Inventors: Thomas Mörwald, Bregenz (AT); Zoltán Török, Berneck (CH); Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 17/000,145

(22) Filed: Aug. 21, 2020

(65) Prior Publication Data

US 2021/0056716 A1   Feb. 25, 2021

(30) Foreign Application Priority Data

Aug. 23, 2019  (EP) .................................. 19193485

(51) Int. Cl.
*G06T 7/33* (2017.01)
*G01S 17/894* (2020.01)
(Continued)

(52) U.S. Cl.
CPC ............ *G06T 7/337* (2017.01); *G01S 17/894* (2020.01); *G06T 3/4053* (2013.01); *G06T 5/50* (2013.01);
(Continued)

(58) Field of Classification Search
None
See application file for complete search history.

(56) References Cited

U.S. PATENT DOCUMENTS

| 9,377,301 B2 | 6/2016 | Neier et al. |
| 2015/0323672 A1 | 11/2015 | Shenkar et al. |

(Continued)

FOREIGN PATENT DOCUMENTS

| EP | 1 903 303 A2 | 3/2008 |
| EP | 2 765 388 A1 | 8/2014 |

OTHER PUBLICATIONS

Meiqing Liu et al., "Three-Dimensional Reverse Engineering Modeling and Numerical Simulation of Pump Based on Laser Scanning Technology," E-Product E-Service and E-Entertainment (ICEEE), 2010 International Conference on, pp. 1-4, (Nov. 7, 2010).

(Continued)

*Primary Examiner* — James A Thompson
(74) *Attorney, Agent, or Firm* — Maschoff Brennan

(57) ABSTRACT

Three-dimensional (3D) point cloud generation using a stationary laser scanner and a mobile scanner. The method includes scanning a first part of a surrounding with the stationary laser scanner, obtaining a first 3D point cloud, (Continued)

scanning a second part of the surrounding with the mobile scanner, obtaining a second 3D point cloud, whereby there is an overlap region of the first part and the second part, and aligning the second 3D point cloud to the first 3D point cloud to form a combined 3D point cloud. The positional accuracy of points of the second 3D point cloud is increased by automatically referencing second scanner data of the overlap region, generated by the mobile scanner, to first scanner data of the overlap region, generated by the stationary laser scanner. Therewith, deformations of the second 3D point cloud and its alignment with the first 3D point cloud are corrected.

20 Claims, 5 Drawing Sheets

(51) Int. Cl.
    *G06T 3/40*      (2006.01)
    *G06T 5/50*      (2006.01)
    *G06T 19/20*      (2011.01)
(52) U.S. Cl.
    CPC .... *G06T 19/20* (2013.01); *G06T 2207/10028* (2013.01); *G06T 2207/20212* (2013.01); *G06T 2219/2004* (2013.01)

(56) References Cited

U.S. PATENT DOCUMENTS

| | | | | |
|---|---|---|---|---|
| 2016/0314593 | A1* | 10/2016 | Metzler | H04N 5/23238 |
| 2020/0158875 | A1* | 5/2020 | Feng | G01S 7/4808 |
| 2021/0374978 | A1* | 12/2021 | Döring | G06T 7/33 |

OTHER PUBLICATIONS

Xu Zhihua et al., "Extraction of Damaged Building's Geometric Features From Multi-Source Point Clouds," 2014 IEEE Geoscience and Remote Sensing Symposium, IEEE, pp. 4764-4767, (Jul. 13, 2014).

R. A. Persad et al., "Alignment of Point Cloud DSMs From TLS and UAV Platforms," ISPRS—International Archives of the Photogrammetry, Remote Sensing and Spatial Information Sciences, vol. XL-1/W4, pp. 369-373, (Aug. 30, 2015).

Johannes Schauer et al., "The Peopleremover-Removing Dynamic Objects From 3-D Point Cloud Data by Traversing a Voxel Occupancy Grid," IEEE Robotics and Automation Letters, vol. 3, pp. 1679-1686, (Feb. 5, 2018).

European Search Report in European application No. 19193485.0 dated Feb. 10, 2020.

Leica Nova MS50 Data Sheet, Leica Geosystems AG (2013).

Leica ScanStation P20 Data Sheet, Leica Geosystems AG (2013).

* cited by examiner

COMBINED POINT CLOUD GENERATION USING A STATIONARY LASER SCANNER AND A MOBILE SCANNER

CROSS-REFERENCE TO RELATED APPLICATIONS

This application claims priority to European Patent Application No. 19193485.0, filed on Aug. 23, 2019. The foregoing patent application are incorporated herein by reference.

FIELD OF THE INVENTION

The present invention relates to a method and a system for 3D point cloud generation by use of a stationary laser scanner and a mobile scanner.

BACKGROUND

For gathering dimensional information about an object, particularly of topographical information, the surface of such object typically may be scanned using a laser beam which is moved over the object in a predefined manner. Geodetic measuring devices like a terrestrial stationary laser scanner or a total station, e.g. Leica P20, Leica Multi Station 50, are characterized by high measurement accuracy, allowing for very precise scanning of the object, e.g. with an accuracy in the millimetre range or better even up to object distances of several hundred meter. By scanning the object, a so called (3D-) point cloud is created representing the object by an amount of points with defined positions in a common coordinate system. Such terrestrial laser scanner as known in the art can also provide accurate geometric representation of the environment other than a point cloud.

The point cloud is derived by determining a distance for each measuring point and a correlated direction of the laser beam when determining the distance. The point-to-point resolution of such measuring points and the resulting point cloud, respectively, is defined by the speed of moving the laser beam on the surface and a triggering-interval for triggering single measurements (e.g. one for each measuring point). The effective point-to-point resolution is also dependent on the distance to the surface to be scanned: with the same device configuration, a near surface is scanned with a denser point grid than a surface farer away.

In addition to generating the point cloud there often is captured an image of the object by a capturing unit of the scanning device. The image provides further information concerning the object, e.g. concerning colours or textures of the object.

As from one station point usually only a part of the object, e.g. large areas or a facility with many rooms, is measurable while other surface points are hidden, it becomes necessary to set up the measuring devices at least at two different positions with respect to the object such that in combination the whole surface of the object is measurable. Several methods for post-processing registration of point clouds are known, e.g. marker-based or image-based registration first for coarse registration and afterwards geometry-based registration (iterative closest point) for fine adjustment.

The surveying instrument needs direct line-of-sight to the object points to measure. In case of an obstruction, e.g. a tree in front of a building which occludes a part of the façade leads to a so called "scanning shadow" (see FIG. 1a). In practice, in such a case the surveying instrument also is set up at a different position where direct line-of-sight to the missing parts is given. Therefore, more than one setup of the surveying instruments is needed and each additional setup takes time and reduces the productivity of the user.

Moreover, a full-dome-scan, i.e. a scanning area from 0° to 360° in horizontal and −45° to 90° in vertical direction, with a terrestrial laser scanner in highest resolution takes some time. In this resolution the distance between the points in 100 meters is 1.0 mm. For every new setup of the instrument a full 360° panorama image is usually obtained which also takes several minutes. Thus, relocating a laser scanner or a similar surveying instrument (e.g. total station) and recording a second set of measuring data (second point cloud) is time consuming and needs an expert at least for referencing the first point cloud relative to the second point cloud.

EP 1 903 303 B1 discloses a method of combining point cloud data with image data in order to fill up missing parts of the point cloud. The camera unit is used for recording a set of images which are split into a set of stereoscopic image pairs. Every image pair is processed independently. Moreover, the panorama image obtained by a laser scanner (the so-called "main image") is used for pair wise matching with one stereoscopic image pair and thus providing adding dimensional information of the respective stereoscopic image pair to the point cloud. The whole process is performed in a post-processing step having all data of the set of images and the laser scanner ready for processing.

Alternative to stationary scanners, there are mobile scanners known, too. Such mobile devices have the advantage that a change of station is more easily and less time-consuming possible than with a stationary laser scanner described above; even scanning whilst moving is enabled with some mobile scanners. For example, the EP 2 765 388 B1 discloses a hand-held device which may have a scanning unit for 3D point cloud generation, e.g. a laser scanning unit. For referencing of the 3D point cloud, the respective pose (position and orientation) of the mobile scanner has to be determined. According to the EP 2 765 388 B1, the mobile device has to comprise for this purpose a geodetic target object which is to be targeted by a geodetic measuring device such as a total station. As easier solutions for pose determination, there is known in the art to furnish a mobile scanner with position sensors on board such as an Inertial Measuring Unit (IMU) or GNSS sensors. However, such sensors allow only for rather imprecise position and orientation determination. Generally spoken, a main drawback of such mobile scanners is their low accuracy, specifically when capturing large areas.

BRIEF DESCRIPTION

It is therefore an object of some embodiments of the present invention to provide a method and system for facilitating generation of a complete 3D point cloud of an environment or surrounding which is easy to use, less time-consuming and nevertheless enables a high measurement accuracy.

Another object is to provide an improved method for generating a common or combined 3D point cloud of an object directly in the field, particularly during a measuring process, wherein scan data gathered with separated scanners is considered for generating the combined point cloud.

A further object of some embodiments of the invention is to provide a method and system for enabling more flexible and easier precise measuring of objects, in particular from all sides.

This object is achieved by realising the features of the independent claims. Features which further develop the invention in an alternative or advantageous manner are described in the dependent patent claims.

Some embodiments of the present invention relate to a method for 3D point cloud generation using a stationary laser scanner and a, in particular hand-held or airborne, mobile scanner. The method comprises a scanning of a first part of a surrounding with the stationary laser scanner, obtaining a first 3D point cloud, a scanning a second part of the surrounding with the mobile scanner, obtaining a second 3D point cloud, whereby there is an overlap region of the first part and the second part of the surrounding and an aligning the second 3D point cloud to the first 3D point cloud to form a combined 3D point cloud.

Within the scope of the method, the positional accuracy of individual points or cluster of points of the second 3D point cloud is increased based on automatically referencing second scanner data of the overlap region, generated by the mobile scanner, to first scanner data of the overlap region, generated by the stationary laser scanner, serving as positional reference. Therewith, deformations of the second 3D point cloud and its alignment with respect to the first 3D point cloud are corrected.

In other words, first scanner data by the stationary laser scanner is used a positional reference with which the positional accuracy of second 3D point cloud points generated by the mobile scanner is improved, individually and/or by changing position of a group of points. Thereby, scanner data refers to all kind of measurement data acquired by a scanner, particularly 3D-scan data (generated by laser scanning but also 2D-image data generated by a camera of the laser scanner. Scanner data can comprise "auxiliary" measurement data such as GNSS-position data, too.

Thus, (translational and/or rotational) position of the second 3D point cloud as well as its scale, shape etc. are improved or corrected using the measurement data generated by the stationary scanner as reference.

In a further development of the method, the referencing comprises a global optimization that jointly minimizes at least one of 2D-to-2D distance, 2D-to-3D distance, 3D-3D distance between 3D points and/or 2D reprojection of the first and the second scanner data in such a way that it leads to a best-fit between the two 3D point clouds.

Optionally, the referencing considers a calibration and/or position and orientation (pose) model of the mobile sensor, whereby as another option, the model comprises a parametric function describing a distance and/or difference of corresponding points of the first and second scanner data (point cloud data and/or data of an image generated by the stationary or mobile scanner).

As an option, said function describes a distance to be minimized between corresponding points of the first and the second 3D point cloud. Alternatively or additionally, the function describes a distance to be minimized between a point of the first and/or second 3D point cloud and a corresponding 3D point derived, particularly by triangulation, from two images of at least part of the overlap region taken by a camera of the stationary laser scanner and/or mobile scanner from two different positions. Alternatively or additionally, the function describes an intensity difference to be minimized between corresponding points of a first image of at least part of the overlap region taken by a camera of the stationary laser scanner and of a second image of at least part of the overlap region taken by a camera of the mobile scanner. Alternatively or additionally, the function describes an intensity difference to be minimized between a point of the first and/or second 3D point cloud and its correspondence in an image of at least part of the overlap region taken by a camera of the stationary laser scanner and/or mobile scanner.

In a further development, based on the referencing, at least one of offset, scale, bias and/or alignment of a scan and/or positional sensor of the mobile scanner is calibrated. As another option, a position and/or orientation of the mobile sensor relative to the stationary laser scanner is corrected based on the referencing, in particularly continuously during a movement of the mobile sensor relative to the stationary laser scanner.

Optionally, there is a feature detection (features such as points, edges, corners, lines and/or surfaces) within the first and the second point data and the referencing is based on detected features. Thus for instance, a 3D-3D constraint may not only 3D-point to 3D-point, but 3D-point to plane as well.

Preferably, the method is conducted directly and instantaneously during a scanning/surveying process.

Optionally, the second 3D point cloud serves for clearing up the first 3D point cloud by removing scan data relating to unwanted objects of the surrounding and/or serves for filling gaps of first 3D point cloud and/or for increasing the spatial resolution of selective parts of the first 3D point cloud.

Some embodiments of the invention also relate to a system for 3D point cloud generation comprising a stationary laser scanner, in particular laser scanner or total station, a mobile, in particular hand-held or airborne, scanner and an electronic system controller which is designed to effect the method according to some aspects of the invention.

Some aspects of the invention also relate to a computer programme product having computer-executable instructions implemented for performing the method according to some embodiments of the invention.

As the second 3D point cloud might be distorted due to inaccurate calibration of the mobile scanner, resulting in a wrongly scaled, deformed, e.g. bended point cloud, the idea of the present invention is to reference mobile scanner data to stationary scanner data to increase the completeness as well as accuracy of the resulting combined point-cloud, preferably by calibration of intrinsic and/or extrinsic parameters and/or the 3D points of the mobile sensor. Using an overlap of surveying region of the stationary scanner and of the mobile scanner as described enables an increase of accuracy of mobile scanner points with stationary scanner points by calibration of the sensor parameters of the mobile device and/or to correct the pose (position and orientation) error inherent to mobile scanner relative to the stationary scanner by continuously aligning the MS point-cloud to the stationary scanner point-cloud, which can be done in real-time while the mobile scanner is moved through space.

Further it is proposed to take advantage of image data. Many terrestrial laser scanners as well as mobile scanners already have cameras for positioning and/or for colorizing the resulting point-cloud. In situations where the alignment of point-clouds is ill-conditioned (e.g. flat surfaces), visual features in intensity images of the stationary scanner and mobile scanner are used to constrain the registration of the point-clouds.

By minimizing the offset of visual and 3D-point correspondences between the second and the first 3D point cloud in the overlapping regions, the position/orientation and calibration parameters of the mobile scanner are optimized in such a way that it leads to a best-fit between the two 3D point clouds. In other words, the method leads to a correction of deformations of the second 3D point cloud of the mobile scanner and an accurate alignment with respect to the first point cloud of the stationary laser scanner or with respect to the scanned object.

Thus, the mobile scanner benefits from or is improved by the highly accurate stationary scanner points. The mobile scanner can be a low-cost device prone to errors where initial calibration parameters are not stable over time or because of temperature, shocks or humidity. By calibration of such parameters according to the invention with the stationary laser scan point data as reference, these errors are compensated, leading to higher accuracy of the MS point-cloud and, hence, to higher accuracy of the combined point-cloud.

The idea leads to the benefits of faster data acquisition by combining the speed of a stationary terrestrial laser scanner and the mobility of a mobile scanner, whereby data from point of views that are not accessible by a stationary scanner can be captured and accuracy of the mobile scanner point-cloud is increased by calibration using the stationary laser scanner point-cloud.

DESCRIPTION OF THE DRAWINGS

The method and the system according to the invention are described or explained in more detail below, purely by way of example, with reference to working examples shown schematically in the drawings. Specifically.

FIG. 2 shows another example of improving the accuracy of a mobile sensor or the 3D point cloud generated with;

DETAILED DESCRIPTION

Figure 1A:
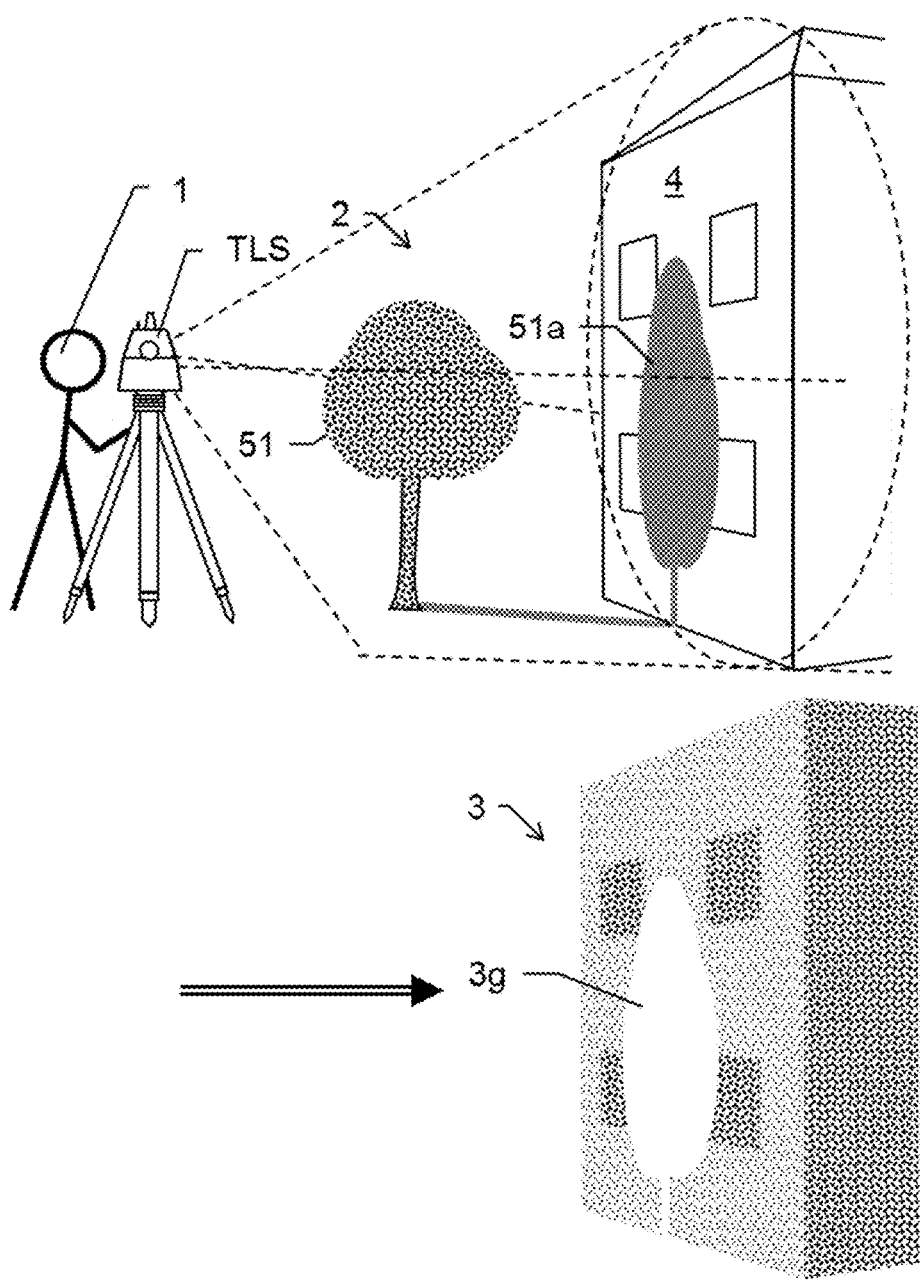
FIG. 1*a-d* show a first example of a method according to the invention.

FIG. 1*a-d* show a first example of a method according to the invention. FIG. 1*a* depicts an operator 100 using a stationary terrestrial laser scanner TLS for scanning an object 4, for example a building. With such measurement a first 3D point cloud 3 with first 3D point data is generated representing the surface of the object 4 and covering these parts of the object 4 which are within a scan area 2 and according to the relative position of the laser scanner TLS and respective lines of sight from the stationary scanner TLS to the object 4 can be measured, i.e. are visible. The stationary scanning instrument TLS enables the acquisition of millions of points in short time with very high accuracy.

As can be seen in FIG. 1*a*, an obstacle 51 (here: a tree) is located between the laser scanner TLS and the object 4 to be scanned. Thus, a line of sight to the object 4 is not given with respect to the entire front surface of the object 4. The tree 51 produces a scanning shadow 51*a* with respect to a scanning measurement which results in a gap 3*g* of the 3D point cloud of the building 4. With other words, a point cloud of the object 4 generated with the stationary laser scanner TLS comprises an area with points not relating to the object 4 or an area with no points (depending on measuring conditions). Such a gap 3*g* of object data of an object of interest also emerges with capturing an image of the object with a camera on side of the laser scanner TLS.

According to one aspect of the invention, the first 3D point cloud generated by the laser scanner TLS is extended or completed during the scanning process by generating a further or second 3D point cloud related to the object 4. Such second 3D point data is gathered by additional use (additional to the stationary laser scanner TLS) of a separated and mobile scanner MS. If the mobile scanner MS is positioned considerably nearer to the object to be scanned than the stationary scanner TLS as shown in the FIG. 1*b* below, the 3D scan of the object can not only be completed but in addition the accuracy or point density of a complemental scan area 5 measured with the mobile scanner MS can be higher compared to a scan with the stationary scanner TLS (which is of course dependent on the specific mobile scanner MS resp. its measuring settings).

Figure 1B:
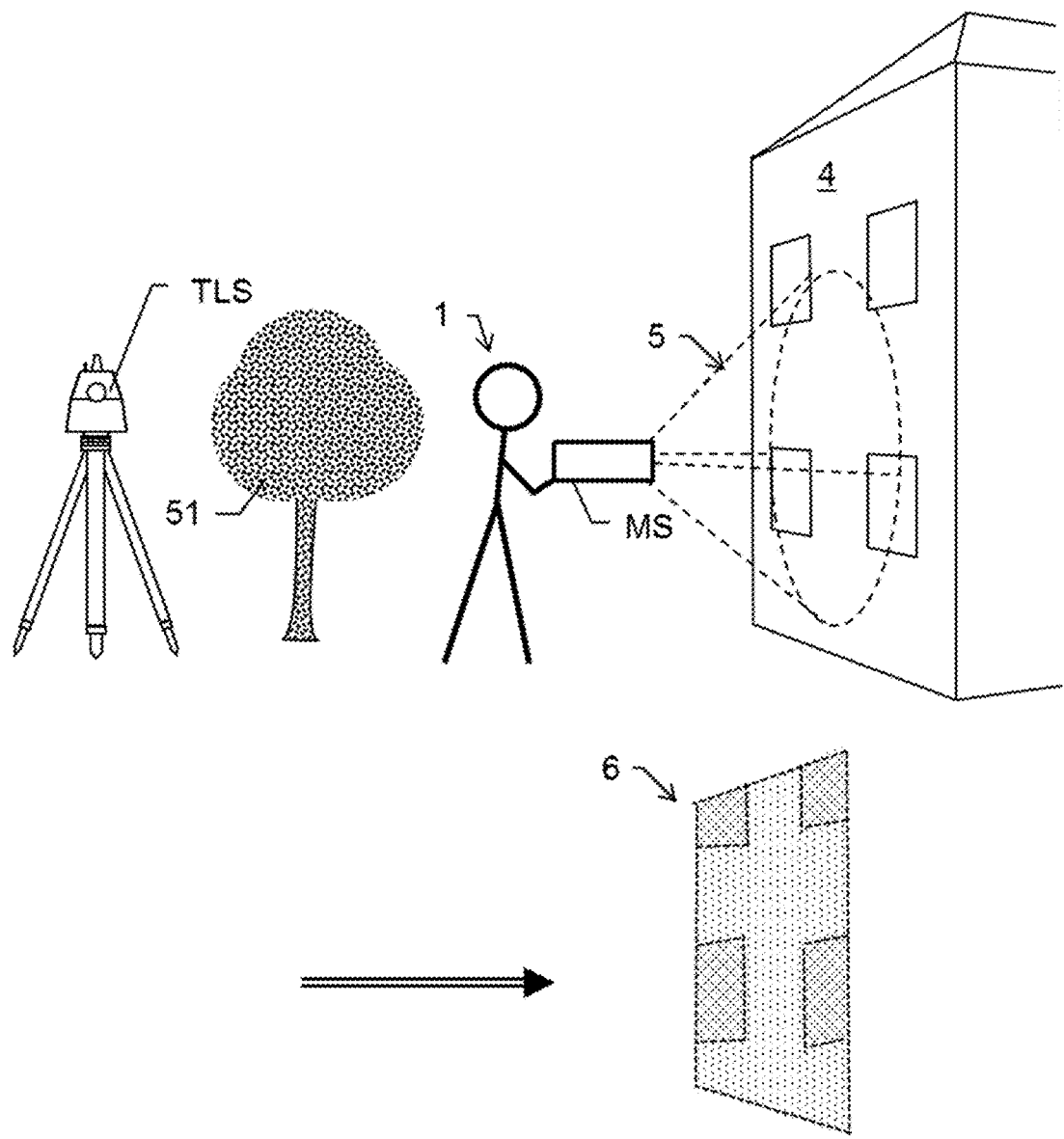

FIG. 1*b* shows the operator 100 holding such a mobile scanner MS and scanning part of the object 4, including the scanning shadow 51*a*, by guiding a laser beam (not shown) as part of an electronic distance meter over the object's surface, e.g. using a deflection mirror for beam direction change as known in the art. Alternative to such a handheld scanner, the mobile scanner MS can e.g. be mounted on a vehicle or unmanned aerial vehicle (UAV) such as a drone to reach point of views that are not accessible by humans.

As a result of scanning with the mobile scanner MS, a second 3D point cloud 6 is generated. Such a second 3D point cloud can for instance be generated by such a mobile scanner MS based on stereometry or using structured-light sensors or similar techniques known in the art, too.

In fact, the accuracy of the second 3D point cloud 6 is considerably lower than that of the first 3D point cloud due to the precision limitations of such a mobile scanner MS compared to a stationary laser scanner TLS. Such precision limitations are due to measurement noise as well as due to systematic errors caused by inaccurate calibration that leads to a deformed, bended or wrongly scaled point cloud. In the example, the lower precision is indicated in FIGS. 1*b*-1*d* by a less dense point pattern of second point cloud 6 compared to the point pattern of the first point cloud 3 and offset and distortion of second point cloud 6 compared to the first point cloud 3.

Thereby, the scan area 5 measured with the mobile scanner MS intersects partly with the previous scan area 2 of the stationary scanner TLS. Thus, the first 3D point cloud 3, generated by the stationary scanner TLS, and the second 3D point cloud 6, generated by the mobile scanner MS show an overlap.

Figure 1C:
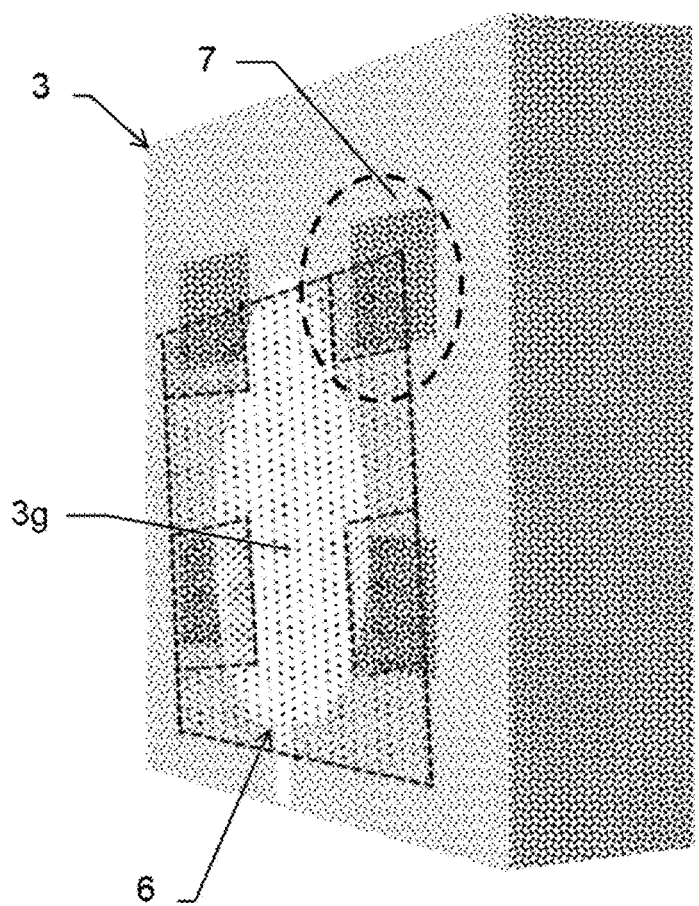
Figure 1D:
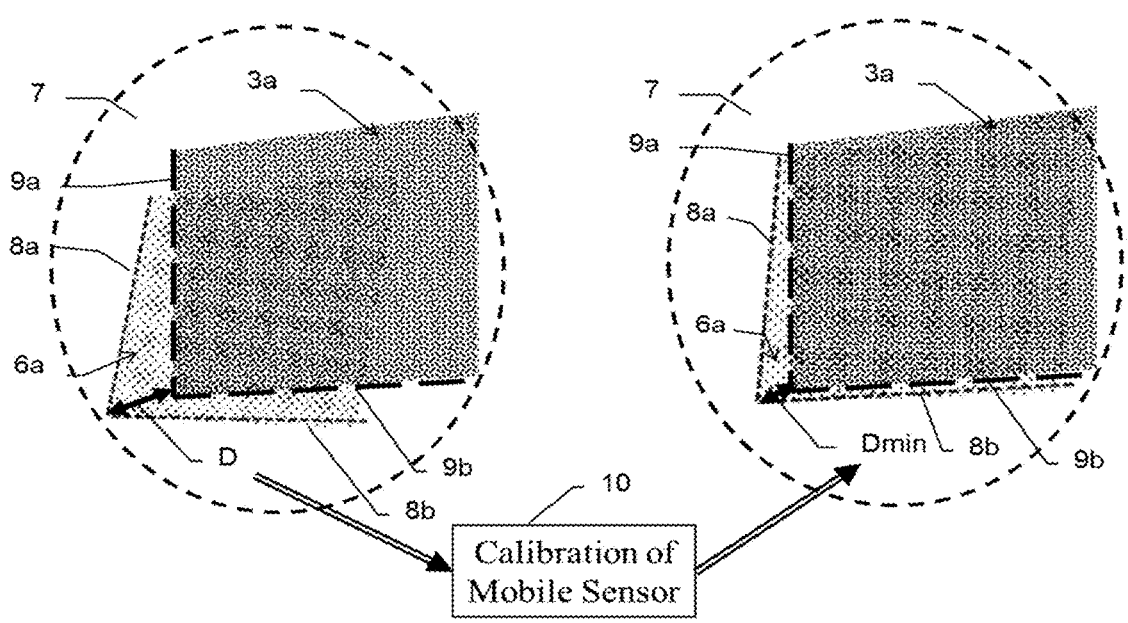

FIG. 1*c* illustrates a simplified overlay of the first 3D point cloud 3 of the stationary scanner TLS and the second 3D point cloud 6 of the mobile scanner MS. It can be seen that the second 3D point cloud 6 fills the gap 3*g* of the first point cloud 3. Thus, by aligning or matching the second point cloud 6 to the first point cloud 3 e.g. using an Iterative Closest Point (ICP)-algorithm, a combined point cloud can be formed, which covers the object 4 without gaps.

Optionally, the second point cloud 6 is used to remove unwanted scan data e.g. relating to tree 51 from the first point cloud 3 or combined point cloud. Hence, the final 3D point cloud is cleared up from objects 51 of no interest, for instance tree 51 or non-permanent objects such as a car accidentally present in the surrounding.

Alternatively or additionally, particularly if the distance between the stationary scanner TLS and the object 4 is great and in contrast the mobile scanner MS scans the object 4 from nearby (close-up measurement), the second point cloud 3 is used to increase the spatial resolution of the first point cloud 6 as the effective point-to-point distance of the second point cloud then is considerably higher even if the scan resolution of the mobile scanner MS as such is lower than that of the terrestrial scanner TLS. As another option, an initial spherical scan of an environment by the stationary scanner TLS can be updated or refined later on by the mobile sensor MS which for instance is advantageous on a construction site where geometric or visual changes are frequent. This way, elaborate additional spherical scans by the terrestrial scanner TLS can be avoided.

Also, one can see in FIG. 1c the distortions and misalignment of the second 3D point cloud 3 relatively to the first point cloud 3 due to the poor precision/calibration of the mobile sensor as well as the overlap of both point clouds 3, 6. Part of the overlap 7 is marked and will be referred to with respect to FIG. 1d.

FIG. 1d is a magnified cut-out of FIG. 1c, showing two times the local overlap 7. On the left side, the initial second 3D point cloud section 6a is indicated. This initial second 3D point data results from the scanning pose of the mobile sensor MS as determined e.g. by on-board position sensors such as GNSS-receiver and/or an IMU and from the mobile sensor's scanning unit, e.g. electronic distance meter (EDM) and angular encoder (for measuring a deflection angle of a mobile sensor's scanning light beam). As said, this initial positional accuracy of the gathered second scan points is insufficient or considerably lower than the one gathered with the stationary terrestrial laser scanner TLS. This results—as indicated in FIG. 1d—in an offset and rotation (misalignment) of the first 3D point cloud 6a relatively to the second point cloud 3a as well as a differing scale (e.g. the edge 8b of the second point cloud 6a is shorter than its corresponding edge 9b of the first point cloud 3a) and bend (indicated in the figure by different angles between edges 8a,8b and 9a,9b). Said otherwise, the pose as well as shape of second point cloud 3a lacks accuracy.

According to the invention, in order to compensate for the positional deficiencies of the second 3D point data 6 resp. 6a, the highly positional accurate first 3D scanner data 3 resp. 3a is taken as positional reference. The high accuracy of the position of points (of a camera image or the point cloud) generated by the stationary scanner are used to gauge or calibrate the position of corresponding individual or cluster of points (of a camera image or the point cloud) generated by the mobile scanner, and therewith increasing the positional accuracy of the 3D points of the mobile scanner. The second scanner data 6a is corrected or improved using the first scanner data 3a, e.g. serving as pose (position and orientation) and shape reference.

This procedure resp. the method is automatically effected (and thus very user friendly) by a control and evaluation unit or system controller of the stationary terrestrial laser scanner TLS, the mobile scanner MS and/or an external controlling device of the measuring system comprising the stationary terrestrial laser scanner TLS and mobile scanner MS.

In the example, the position correction is done by minimizing distances of points of the second point cloud 6a to their corresponding points in the first point cloud 3a, indicated in FIG. 1d by exemplary distance D. The second point cloud 6a is fitted best to the first point cloud 3a in that individual points or whole point clusters (e.g. the group of points as shown in FIG. 1d) are relocated.

As depicted in exemplary FIG. 1d, this procedure comprises a step of edge detection in both point data sets 3a, 6a, resulting in edges 8a, 8b and 9a, 9b respectively. Hence in the example, the referencing is done not (only) using single points (and their correspondences), but points grouped together are used as first and second scanner data.

The distance D in between these edges 8a, 8b, 9a, 9b is minimized in the example in that based on the positional reference of the first point data 3a, there is a calibration 10 of the mobile sensor MS—or more specifically its on-board sensors (GNSS, IMU, EDM etc). For example, calibration parameters of the mobile sensor are updated such that the initial distance or difference D of second scan points 6a to first referential scan points 3a is optimized to distance $D_{min}$. Particularly, an offset, scale bias and/or axis misalignment of such scan sensors and/or positional sensors of the mobile sensor MS is corrected or calibrated based on the reference first point data 3a.

By minimizing the offset of visual and 3d-point correspondences between the second (MS) point cloud 6a and the first (TLS) point cloud 3a in the overlapping region 7, the position/orientation and calibration parameters of the mobile sensor MS are optimized in such a way that it leads to a best-fit between the two point clouds 3, 6. In other words, the method leads to a correction of the deformations of the second point cloud 6 and an accurate alignment with respect to the first point cloud 3 by improving the position or coordinates of single points and/or point clusters (e.g. point clusters such as partitions or sections of the second point cloud 6).

As an alternative or addition to such a sensor calibration, scan pose data (position and orientation) of the mobile scanner MS or second 3D point cloud data 6 can be corrected directly using the first 3D point cloud 3 as positional reference. Thus, the distance D between corresponding points is minimized as a function of position, orientation, calibration parameters and/or 3D point cloud of the mobile scanner MS.

The calibration is formulated as optimization problem where a cost function is minimized and the position/orientation and calibration parameters are optimized. The position/orientation parameters are defined for instance by the six degrees-of-freedom, e.g. X, Y, Z and $\varphi$, $\omega$, $\kappa$. The calibration parameters can be manifold, e.g. in case the mobile scanner is a stereo camera then one parameter could be the length of the baseline b, or orientation angles of the second camera with respect to the first one. In case the mobile scanner is Lidar-based then the EDM addition constant could be one of those parameters. The cost function could be compiled from the above mentioned 2D-to-2D, 2D-to-3D, and 3D-to-3D constraints derived from the offsets between the corresponding visual features and the corresponding 3D-points from the TLS and MS scan data. The optimization can be carried out in a form of an adapted SLAM-approach, an extended bundle adjustment and/or iterative closest point algorithms or any other related algorithm for positioning and calibration known from the state-of-the-art.

Figure 2:
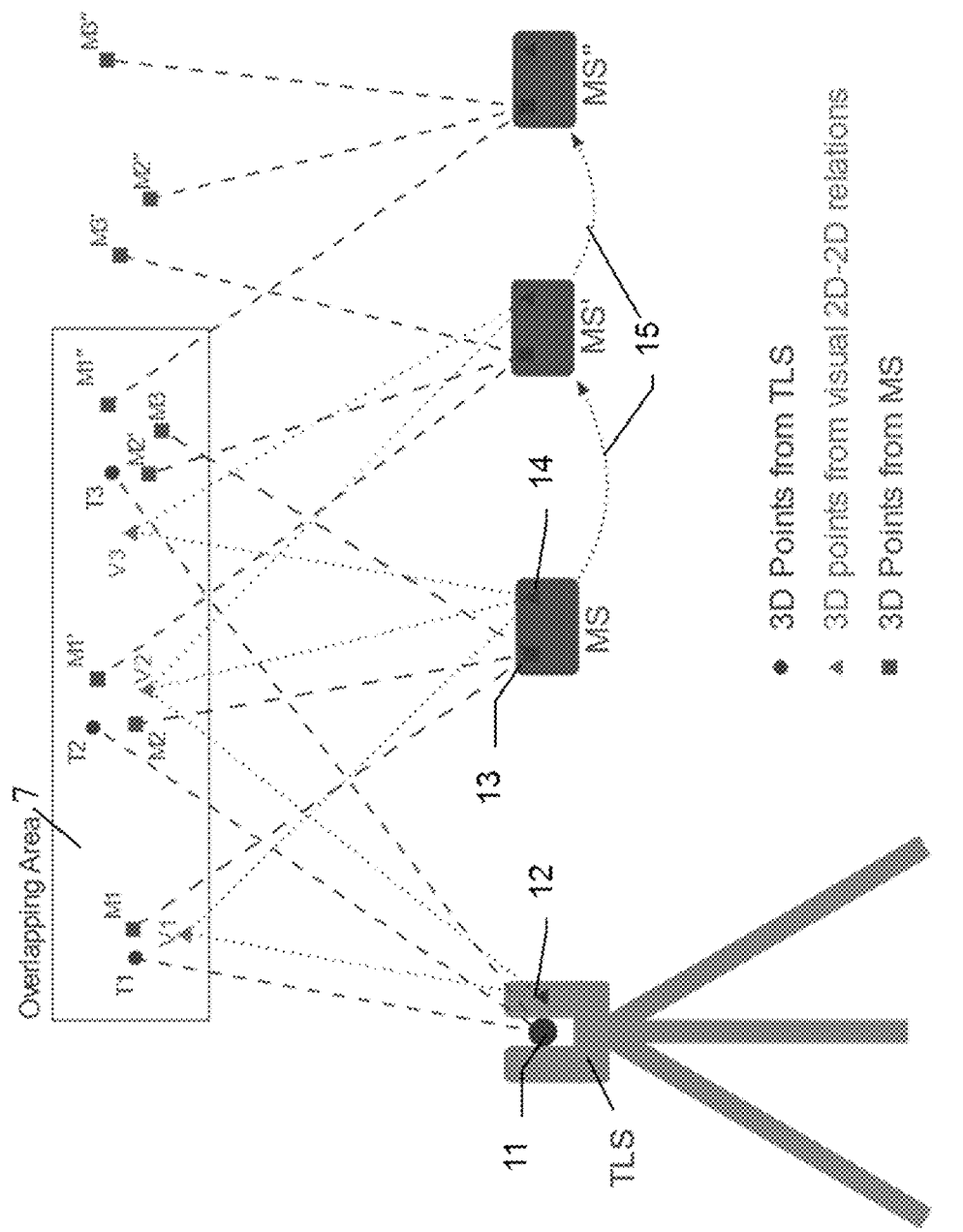

FIG. 2 shows another example of improving the accuracy of the mobile sensor MS or the 3D point cloud generated with. In the example, both scanning devices, the stationary one TLS and the mobile one MS, comprise a scanning unit 11 resp. 13 and an image capturing unit or camera 12 resp. 14. Using the scanning unit 11, the stationary scanner TLS measures 3D points T1, T2, T3.

The mobile sensor MS is moved along a path in the surrounding (indicated by arrows 15 and the positions MS, MS' and MS") and with the scanning unit 14 scans 3D points M1, M2, M3 in a first pose MS, points M1'-M3' in a second pose MS' and points M1"-M3" in a third pose MS". Some of the scanned 3D points M1-M3, M1', M2' and M1" of the mobile sensor MS lie within an overlapping area 7 with the TLS-scanpoints T1-T3.

In addition to said 3D scan points T1-T3, M1-M3", 3D points V1, V2, V3 from visual 2D-2D relations are generated in the overlap 7 using images captured by the cameras 12 and 14 of the sensors TLS and MS. This is for example based on detection and matching of visual features (using e.g. ORB-, SIFT-, BRIEF-algorithms or optical flow algorithms) or by employing visual-inertial odometry for pose estimation. Such visual features may be included in the optimization employing visual (-inertial) odometry and visual (-inertial) SLAM techniques.

Thus, there is not only a referencing of second 3D-scan point data M1-M1" of the mobile sensor MS to first 3D-scan point data T1-T3 of the stationary scanner TLS, but alternatively or additionally referencing of second visual point data of the mobile sensor MS to visual point data of the stationary scanner TLS in the example in form of the points V1-V3. Adding such visual features advantageously constrains an optimization of the mobile sensor measurement in situations like scanning of flat object surfaces where relying only on 3D scan data as scanner data may lead to ill-conditioned point-cloud alignment.

Generally, the referencing can comprise a global optimization (in addition or instead of more local optimization as depicted in exemplary FIG. 1d) that jointly minimizes 2D-2D distances, 2D-3D distances (e.g. re-projections of points into an image and comparing them to the corresponding 2D image point) and/or 3D-3D distances between corresponding 3D points and/or 2D-reprojections of points generated by the stationary scanner TLS and the mobile scanner MS.

Relying on the TLS-point data as positional reference, the pose of the mobile sensor MS, MS', MS" can be advantageously continuously corrected or refined whilst moving the mobile sensor MS along a path 15 by continuously aligning the MS-point cloud to the TLS-point cloud in real-time while the mobile sensor MS is moved through space.

Optionally, additional measurements of auxiliary sensors such as an IMU or gyroscope can be taken into account of the optimization procedure 20 as further constraints to further improve the best-fit of the second point cloud to the first point cloud, particularly in situations in which the alignment of point-clouds and/or image data might be ambiguous (e.g. flat homogeneous surfaces). Inertial and gyroscope measurements could help to even better constrain the positioning thus increasing accuracy and robustness of data acquisition.

Figure 3:
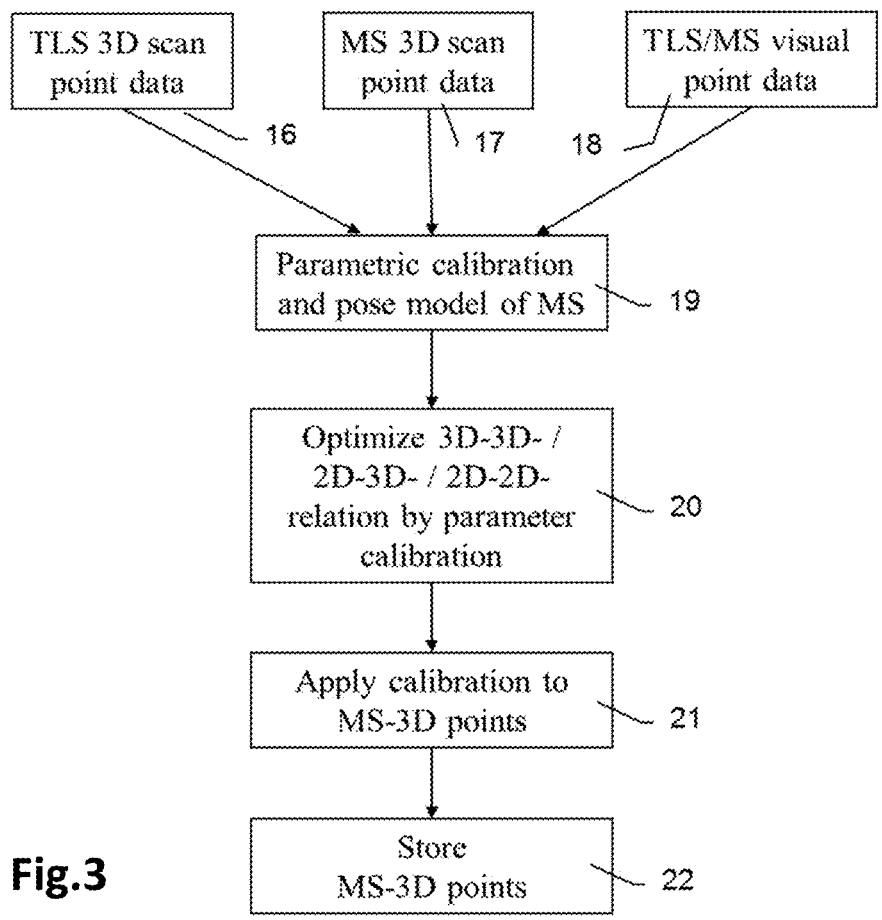
FIG. 3 depicts a further development of 3D point cloud optimization according to the invention.

FIG. 3 depicts a further development of 3D point cloud optimization according to the invention. As shown, 3D scan point data generated by the stationary scanner TLS (box 16 in FIG. 3) and such point data generated by the mobile scanner MS (box 17) as well as visual point data generated by the stationary scanner TLS/mobile scanner MS (box 18) are fed into a parametric calibration and pose model of the mobile sensor MS (box 19). This model models the calibration and position and orientation of the mobile sensor MS and comprises a function describing or measuring a distance and/or difference of corresponding points of first/stationary scanner point data and second/mobile scanner point data, e.g. describing a distance between corresponding points of the TLS 3D scan point data (16) and MS 3D scan point data (17). Parameters of the modelling function are optimized in such a way that the difference is minimized.

The function is for example formulated to measure the distance between corresponding points of the TLS and MS point-cloud (3D-3D relation), the intensity difference between corresponding points of images of the stationary scanner TLS and mobile sensor MS (2D-2D relation), the distance between a point of the stationary scanner TLS or mobile sensor MS and a visually triangulated point from two or more 2D-2D relations (2D-3D relation) and/or the intensity difference of a TLS or MS point projected in two or more images (2D-3D relation). These relations of individual points and/or point clusters are optimized with the point data provided by the terrestrial scanner TLS as reference (box 20; cf. also following FIG. 4)).

A mobile sensor MS with initial (extrinsic and/or intrinsic) calibration parameters not stable over time or due for example to temperature variation, physical shock or humidity benefits from the described optimization resp. parameter calibration in that these errors are compensated, leading to significant higher accuracy of the MS point cloud. Thereby, there is no need of any additional equipment, as the so-to-say low-accuracy mobile sensor MS profits from the high-accuracy scanner TLS which is part of the scanning system anyway.

After the referencing/optimization, the calibration result is applied to the 3D point cloud of the mobile sensor MS (box 21) and the refined 3D point cloud is stored (box 22). Thus, the generation of combined 3D point clouds using such a mobile scanner MS is improved with respect to positional accuracy.

The following sensors and its parameters of the mobile scanner MS serve as example for parameters to be optimized (but are not limited to):
- offset and scaling of EDMs and/or offset of the mirror and the laser direction of an Electronic Distance Measurement (EDM) sensors,
- position and angular offset between cameras and/or projectors, focal length and principal point and/or lens distortion of the cameras and/or projectors of Stereo- or Structure-Light sensors,
- bias (gyroscope, accelerometer), axis misalignment and/or scale of an IMU,
- phase shift/center of an GPS/GNSS,
- Time of Flight sensors,
- Sheet of Light sensors,
- Interferometry and/or
- Structure-from-Motion.

Additionally, the existing points of the point-cloud can be removed or updated.

Thereby, the method is conducted directly and instantaneously during a scanning/surveying process, i.e. the referencing is effected in the field before, during or immediately following the scanning with the mobile scanner. This means, the profits of accuracy enhancement are available "instantaneously", and not delayed until some post-processing.

The following examples are given to illustrate the process of data acquisition. However, the application is not limited to them.

In a first example, the process of calibrating the MS and capturing 3D point data is done separately:

Stage A—Calibration:
1. estimate position, orientation and calibration parameters of the mobile sensor MS relative to the stationary scanner TLS,
2. repeat from 1 until convergence.

Stage B—Data Acquisition:
3. apply calibration parameters,
4. estimate position and orientation of the mobile sensor MS relative to the stationary scanner TLS,
5. store 3D points from the mobile sensor MS and repeat from 1.

In a second example, the process of calibrating the MS and capturing 3D point data is done iteratively:
1. estimate position and orientation of the mobile sensor MS relative to the stationary scanner TLS,
2. calibrate parameters of the mobile sensor MS,
3. apply calibration to 3D point of the mobile sensor MS,
4. store points from the mobile sensor MS and
5. repeat from 1.

In a third example, the process of calibrating the MS and capturing 3D point data is done simultaneously:
1. estimate position, orientation, calibration and 3D points of the mobile scanner MS relative to the stationary scanner TLS,
2. store points from the mobile scanner MS and
3. repeat from 1.

Figure 4:
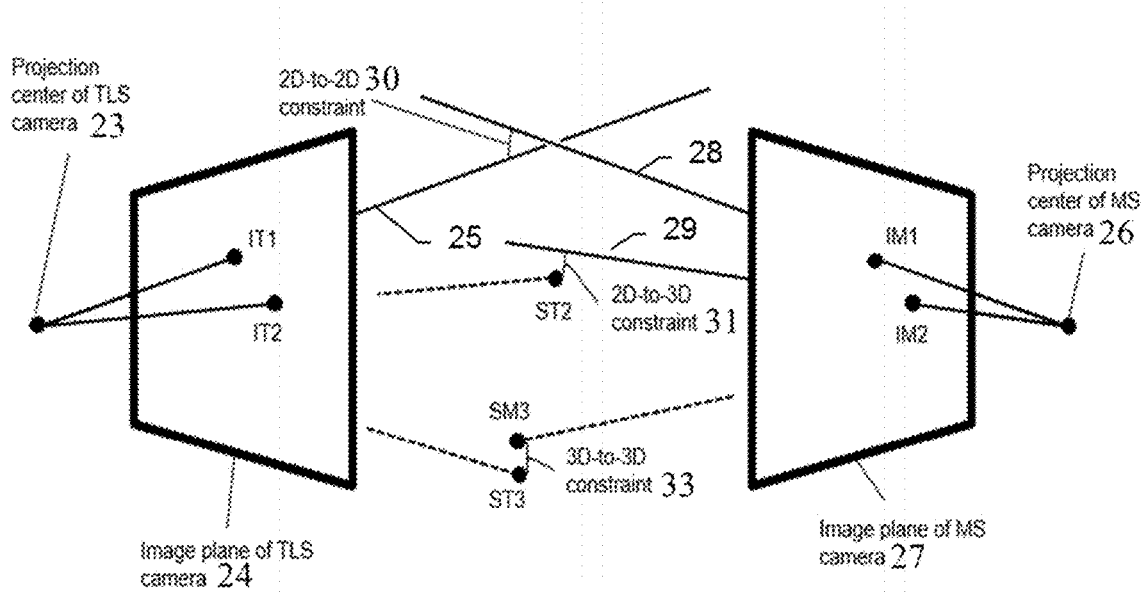
FIG. 4 shows examples for point data referencing.

FIG. 4 shows examples for optimization of point relations of first scanner data of the stationary laser scanner TLS and of second scanner data of the mobile scanner MS.

For a 2D-to-2D matching, a first set of images is captured with the stationary scanner TLS, a second set of images is captured with the mobile scanner MS. Visual features are detected in both image sets and matched to each other, e.g. by feature matching techniques, in order to identify corresponding features that are projections of the same object point, e.g. feature IT1 and IM1. Would the mobile scanner MS be perfectly aligned to the stationary scanner, the ray 25 from the projection center 23 of the stationary scanner TLS to feature point IT1 and the ray 28 from the projection center 26 of the mobile scanner MS to feature point IM1 should perfectly intersect in 3D-space at the position of the corresponding object point.

However, as long both devices are not aligned there is an offset between both rays 25, 28 that is added in the optimization problem as a 2D-to-2D constraint 30.

For a 3D-to-2D matching, after feature matching the corresponding features IT2 and IM2 the coordinates of 3D-point ST2 corresponding to 3D point IT2 are derived from the point cloud.

In case the terrestrial scanner TLS and the mobile scanner MS are perfectly aligned, the ray from the projection center 26 of the mobile scanner MS to IM2 should perfectly go through the 3D-point ST2.

However, as long as both devices are not aligned there is an offset between the ray and the 3D-point that is added in the optimization problem as a 2D-to-3D constraint 31.

For a 3D-to-3D matching, in the point clouds from the stationary laser scanner TLS and the mobile scanner MS corresponding 3d-points, e.g. ST3 and SM3 are identified, e.g. alike in the iterative closed point (ICP) algorithm. The offset between the pair of corresponding 3d-points ST3 and SM3 is added in the optimization problem as a 3D-to-3D constraint 33.

Although the invention is illustrated above, partly with reference to some specific embodiments, it must be understood that numerous modifications and combinations of different features of the embodiments can be made and that the different features can be combined with measuring principles and/or surveying instruments known from prior art.

The invention claimed is:

1. A method for three-dimensional (3D) point cloud generation using a stationary laser scanner and a mobile scanner, the method comprising:
scanning a first part of a surrounding with the stationary laser scanner to obtain a first 3D point cloud;
scanning a second part of the surrounding with the mobile scanner to obtain a second 3D point cloud, wherein there is an overlap region of the first part and the second part of the surrounding, and wherein accuracy of the second 3D point cloud is lower than that of the first 3D point cloud;
aligning the second 3D point cloud to the first 3D point cloud to form a combined 3D point cloud,
wherein:
the positional accuracy of individual points or cluster of points of the second 3D point cloud is increased by automatically referencing second scanner data of the overlap region, generated by the mobile scanner, to first scanner data of the overlap region, generated by the stationary laser scanner, wherein the first scanner data serves as a positional reference, and
therewith correcting deformations of the second 3D point cloud and its alignment with respect to the first 3D point cloud,
wherein the cluster of points of the second 3D point cloud is not a complete second 3D point cloud.

2. The method according to claim 1, wherein the referencing comprises a global optimization that jointly minimizes at least one of two-dimensional (2D)-to-2D distance, 2D-to-3D distance, 3D-3D distance between 3D points or 2D reprojections of the first scanner data and the second scanner data such that a best-fit between the first 3D point cloud and the second 3D point cloud is obtained.

3. The method according to claim 1, wherein the referencing considers a calibration or position and orientation model of the mobile sensor.

4. The method according to claim 3, wherein the model comprises a parametric function describing a distance or difference of corresponding points of the first scanner data and second scanner data.

5. The method according to claim 4, wherein the function describes a distance to be minimized between corresponding points of the first 3D point cloud and the second 3D point cloud.

6. The method according to claim 4, wherein the function describes a distance to be minimized between a point of the first or second 3D point cloud and a corresponding 3D point derived from two images of at least part of the overlap region taken by a camera of the stationary laser scanner or camera of the mobile scanner from two different positions.

7. The method according to claim 4, wherein the function describes an intensity difference to be minimized between corresponding points of a first image of at least part of the overlap region taken by a camera of the stationary laser scanner and of a second image of at least part of the overlap region taken by a camera of the mobile scanner.

8. The method according to claim 4, wherein the function describes an intensity difference to be minimized between a point of the first or second 3D point cloud and its correspondence in an image of at least part of the overlap region taken by a camera of the stationary laser scanner or a camera of the mobile scanner.

9. The method according to claim 1, wherein based on the referencing:
at least one of offset, scale, bias, or alignment of a scan or positional sensor of the mobile scanner is calibrated, or
a position or orientation of the mobile sensor relative to the stationary laser scanner is corrected.

10. The method according to claim 1, wherein there is a feature detection within the first and the second scanner data and the referencing is additionally based on detected features.

11. The method according to claim 1, wherein the method is conducted directly and instantaneously during a scanning process.

12. The method according to claim 1, wherein the second 3D point cloud serves for clearing up the first 3D point cloud by removing scan data relating to unwanted objects of the surrounding.

13. The method according to claim 1, wherein the second 3D point cloud serves:
for filling gaps; or
for increasing the spatial resolution of selective parts, of the first 3D point cloud.

14. The method according to claim 1, wherein the cluster of points of the second 3D point cloud is a portion of the complete second 3D point cloud.

15. The method according to claim 1, wherein the cluster of points of the second 3D point cloud is a partition of the complete second 3D point cloud.

16. The method according to claim 1, wherein the cluster of points of the second 3D point cloud is a section of the complete second 3D point cloud.

17. A system for 3D point cloud generation comprising:
a stationary laser scanner;
a mobile scanner;
an electronic system controller configured to perform:
scanning a first part of a surrounding with the stationary laser scanner to obtain a first 3D point cloud;
scanning a second part of the surrounding with the mobile scanner to obtain a second 3D point cloud, wherein there is an overlap region of the first part and the second part of the surrounding, wherein accuracy of the second 3D point cloud is lower than that of the first 3D point cloud; and
aligning the second 3D point cloud to the first 3D point cloud to form a combined 3D point cloud,
wherein:
the positional accuracy of individual points or cluster of points of the second 3D point cloud is increased by automatically referencing second scanner data of the overlap region, generated by the mobile scanner, to first scanner data of the overlap region, generated by the stationary laser scanner, wherein the first scanner data serves as a positional reference, and
therewith correcting deformations of the second 3D point cloud and its alignment with respect to the first 3D point cloud,
wherein the cluster of points of the second 3D point cloud is not a complete second 3D point cloud.

18. The system according to claim 17, wherein the cluster of points of the second 3D point cloud is a portion of the complete second 3D point cloud.

19. The system according to claim 17, wherein the cluster of points of the second 3D point cloud is a partition or section of the complete second 3D point cloud.

20. A computer program product having one or more non-transitory computer readable media storing computer-executable instructions that in response to being executed by one or more processors, cause a computer system to perform the method according to claim 1.

* * * * *